United States Patent
Al-Toukhi

[11] Patent Number: 6,045,150
[45] Date of Patent: Apr. 4, 2000

[54] COLLAPSIBLE UTILITY CART FOR USE WITH AUTOMOBILE TRUNKS

[76] Inventor: Mazen Al-Toukhi, 4267 Marina City Dr., #706, Marina Del Ray, Calif. 90292

[21] Appl. No.: 09/063,858

[22] Filed: Apr. 21, 1998

[51] Int. Cl.[7] ........................................... B62B 3/02
[52] U.S. Cl. ................... 280/641; 280/651; 280/DIG. 4; 414/498; 414/679; 248/676; 296/20
[58] Field of Search ........................ 280/639, 641, 280/38, 39, 642, 651; 224/496, 486; 296/20; 414/462, 373, 498, 679; 248/129, 133, 166, 439

[56] References Cited

U.S. PATENT DOCUMENTS

| | | | |
|---|---|---|---|
| 2,565,820 | 8/1951 | Machanic | 280/38 |
| 2,780,474 | 2/1957 | Farah et al. | 280/41 |
| 4,192,541 | 3/1980 | Ferneau | 296/20 |
| 4,611,823 | 9/1986 | Haas | 280/641 |
| 5,087,013 | 2/1992 | Gress et al. | 248/676 |
| 5,649,718 | 7/1997 | Groglio | 280/641 |
| 5,772,236 | 6/1998 | Clark | 280/651 |

*Primary Examiner*—Brian L. Johnson
*Assistant Examiner*—Gerald Klebe

[57] ABSTRACT

A collapsible utility cart for use with automobile trunks including a basket having a generally rectangular configuration. The basket has an open upper end and a closed bottom end. A pair of forward legs are included each having an upper end pivotally coupled with a forward portion of the closed bottom end of the basket. Each of the forward legs has a caster disposed on lower ends thereof. The pair of forward legs have an extended orientation whereby they are perpendicular to the closed bottom end of the basket and a collapsed orientation whereby they are folded upwardly to a position abutting the closed lower end of the basket. A pair of rearward legs are each pivotally coupled with a rearward portion of the closed bottom end of the basket. A lower end of each rearward leg has a caster disposed thereon. The pair of rearward legs have an extended orientation whereby they are perpendicular to the closed lower end of the basket and a collapsed orientation whereby they are folded within the open upper end of the basket.

4 Claims, 2 Drawing Sheets

COLLAPSIBLE UTILITY CART FOR USE WITH AUTOMOBILE TRUNKS

BACKGROUND OF THE INVENTION

1. Field of the Invention

The present invention relates to a collapsible utility cart for use with automobile trunks and more particularly pertains to allowing packages to be placed within a trunk of an automobile without having to lift the packages with a collapsible utility cart for use with automobile trunks.

2. Description of the Prior Art

The use of collapsible carts is known in the prior art. More specifically, collapsible carts heretofore devised and utilized for the purpose of transporting articles are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,192,541 to Ferneau discloses a cart having extensible auxiliary wheels. U.S. Pat. No. 4,492,388 to de Wit discloses a collapsible shopping cart. U.S. Pat. No. Des. 348,549 to Trubiano discloses the ornamental design for an elevated shopping cart. U.S. Pat. No. 4,921,295 to Stollenwerk discloses a carriage for an ambulance stretcher. U.S. Pat. No. 5,015,024 to Bloemer discloses a carriage for a stretcher. U.S. Pat. No. 3,980,334 to Ferneau et al. discloses an all level cart with swivel casters.

While these devices fulfill their respective, particular objective and requirements, the aforementioned patents do not describe a collapsible utility cart for use with automobile trunks for allowing packages to be placed within a trunk of an automobile without having to lift the packages.

In this respect, the collapsible utility cart for use with automobile trunks according to the present invention substantially departs from the conventional concepts and designs of the prior art, and in doing so provides an apparatus primarily developed for the purpose of allowing packages to be placed within a trunk of an automobile without having to lift the packages.

Therefore, it can be appreciated that there exists a continuing need for new and improved collapsible utility cart for use with automobile trunks which can be used for allowing packages to be placed within a trunk of an automobile without having to lift the packages. In this regard, the present invention substantially fulfills this need.

SUMMARY OF THE INVENTION

In the view of the foregoing disadvantages inherent in the known types of collapsible carts now present in the prior art, the present invention provides an improved collapsible utility cart for use with automobile trunks. As such, the general purpose of the present invention, which will be described subsequently in greater detail, is to provide a new and improved collapsible utility cart for use-with automobile trunks and method which has all the advantages of the prior art and none of the disadvantages.

To attain this, the present invention essentially comprises a basket having a generally rectangular configuration. The basket has an open upper end and a closed bottom. The device includes a pair of forward legs each having an upper end pivotally coupled with a forward portion of the closed bottom of the basket. Each of the forward legs have a caster disposed on lower ends thereof. A cross bar extends between the forward legs disposed upwardly of the lower ends. A U-shaped handle extends between the forward legs disposed downwardly of the upper ends. A pair of pivot brackets extend between the forward legs and the closed bottom of the basket. Each of the forward legs has a supplemental support leg extending therethrough disposed above the lower ends whereby the supplemental support leg is orthogonally disposed with respect to the forward leg. The pair of forward legs have an extended orientation whereby they are perpendicular to the closed bottom of the basket and a collapsed orientation whereby they are folded upwardly to a position where a rearward extending portion of the supplemental support legs abut the closed bottom of the basket. The device includes a pair of rearward legs each having an upper segment and a lower segment. The upper segment has a length essentially equal to a height of the basket. A lower end of each upper segment is pivotally coupled with an upper end of each lower segment. An upper end of each upper segment is pivotally coupled with a rearward portion of the closed bottom of the basket. A lower end of each lower segment have a caster disposed thereon. The pair of rearward legs have an extended orientation whereby they are perpendicular to the closed bottom of the basket and a collapsed orientation whereby the upper segment is folded against a rear wall of the basket and the lower segment is folded within the open upper end of the basket.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved collapsible utility cart for use with automobile trunks which has all the advantages of the prior art collapsible carts and none of the disadvantages.

It is another object of the present invention to provide a new and improved collapsible utility cart for use with automobile trunks which may be easily and efficiently manufactured and marketed.

It is a further object of the present invention to provide a new and improved collapsible utility cart for use with automobile trunks which is of durable and reliable construction.

An even further object of the present invention is to provide a new and improved collapsible utility cart for use with automobile trunks which is susceptible of a low cost of manufacture with regard to both materials and labor, and which accordingly is then susceptible of low prices of sale to the consuming public, thereby making such a collapsible utility cart for use with automobile trunks economically available to the buying public.

Even still another object of the present invention is to provide a new and improved collapsible utility cart for use with automobile trunks for allowing packages to be placed within a trunk of an automobile without having to lift the packages.

Lastly, it is an object of the present invention to provide a new and improved collapsible utility cart for use with automobile trunks including a basket having a generally rectangular configuration. The basket has an open upper end and a closed bottom. A pair of forward legs are included each having an upper end pivotally coupled with a forward portion of the closed bottom of the basket. Each of the forward legs has a caster disposed on lower ends thereof. The pair of forward legs have an extended orientation whereby they are perpendicular to the closed bottom of the basket and a collapsed orientation whereby they are folded upwardly to a position abutting the closed bottom of the basket. A pair of rearward legs are each pivotally coupled with a rearward portion of the closed bottom of the basket. A lower end of each rearward leg has a caster disposed thereon. The pair of rearward legs have an extended orientation whereby they are perpendicular to the closed bottom of the basket and a collapsed orientation whereby they are folded within the open upper end of the basket.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
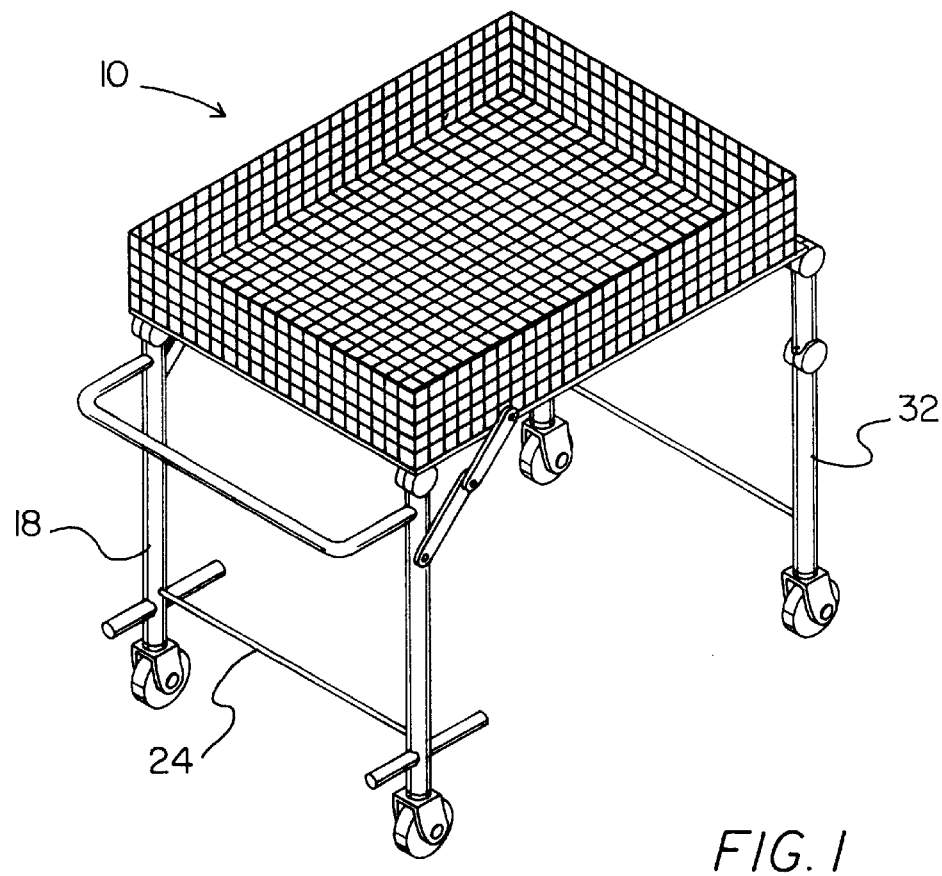
FIG. 1 is a perspective view of the preferred embodiment of the collapsible utility cart for use with automobile trunks constructed in accordance with the principles of the present invention.
Figure 2:
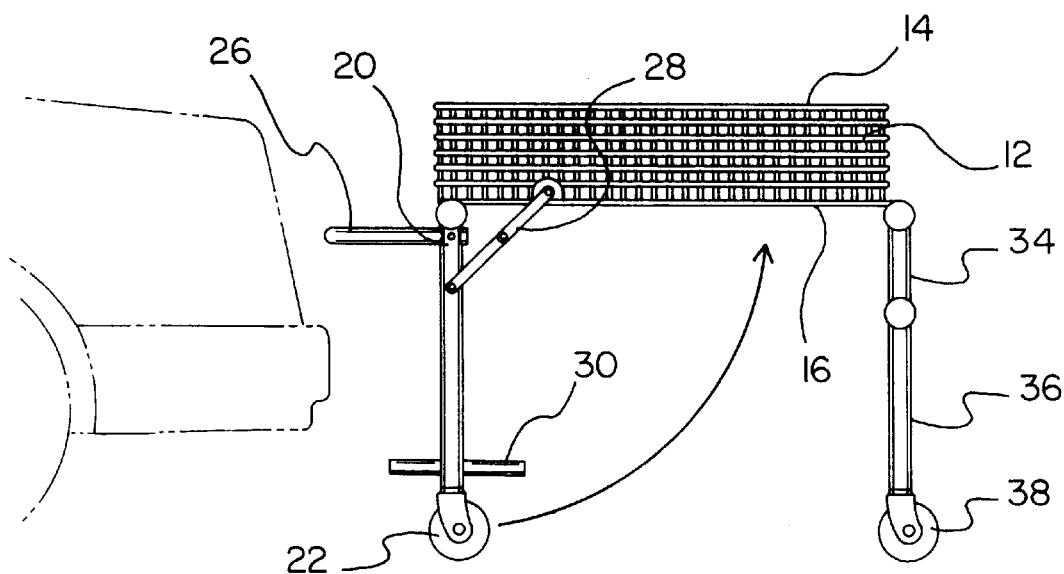
FIG. 2 is a side elevation view of the cart with respect to an automobile trunk.
Figure 3:
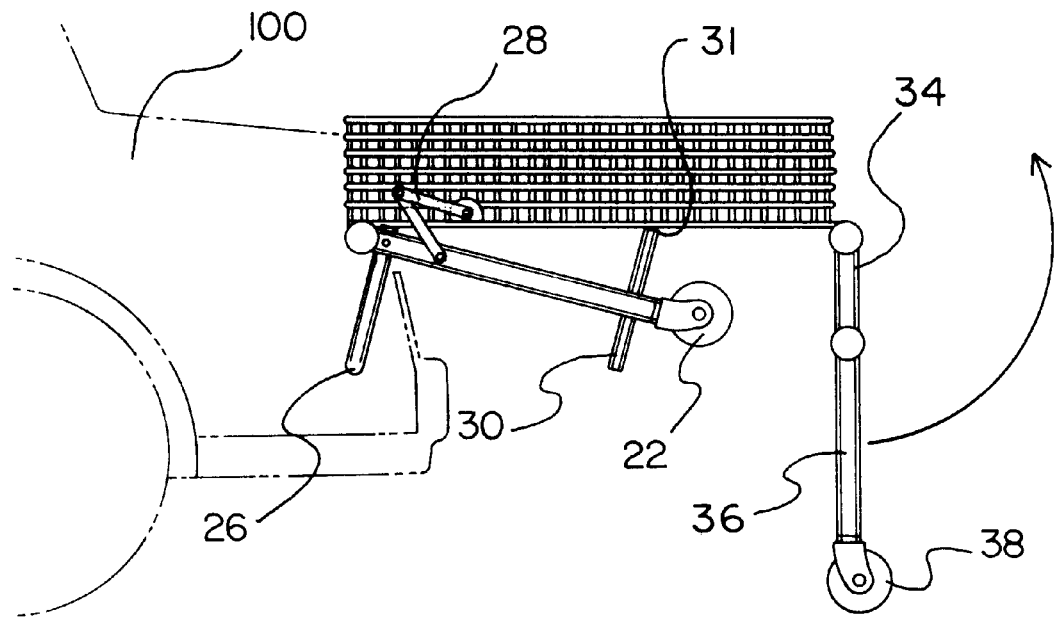
FIG. 3 is a side elevation view of the cart in a semi-folded orientation.
Figure 4:
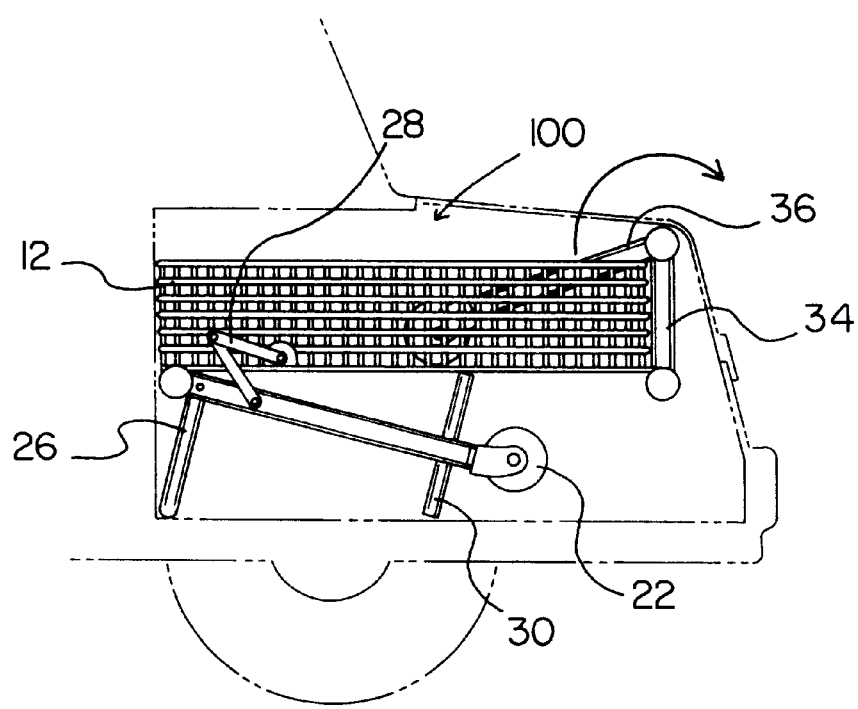
FIG. 4 is a side view of the cart in a folded orientation and disposed within the automobile trunk.

With reference now to the drawings, and in particular, to FIGS. 1 through 4 thereof, the preferred embodiment of the new and improved collapsible utility cart for use with automobile trunks embodying the principles and concepts of the present invention and generally designated by the reference number 10 will be described.

Specifically, it will be noted in the various Figures that the device relates to a collapsible utility cart for use with automobile trunks for allowing packages to be placed within a trunk of an automobile without having to lift the packages. In its broadest context, the device consists of a basket, a pair of forward legs and a pair of rearward legs. Such components are individually configured and correlated with respect to each other so as to attain the desired objective.

The device 10 includes a basket 12 having a generally rectangular configuration. The basket has an open upper end 14 and a closed bottom 16. The basket is of a rigid construction preferably metal or plastic similar to standard grocery store carts in a mesh type configuration. Note FIGS. 1–4. The basket is dimensioned to fit into a trunk 100 of an automobile. Note FIG. 4. Different sized baskets can be constructed that are suitable for different sized automobiles and their trunks, i.e. compacts or sedans.

Next, the device includes a pair of forward legs 18 each having an upper end 20 pivotally coupled with a forward portion of the closed bottom of the basket. Each of the forward legs have a caster 22 disposed on lower ends thereof. A cross bar 24 extends between the forward legs disposed upwardly of the lower ends. A U-shaped handle 26 extends between the forward legs disposed downwardly of the upper ends. A pair of pivot brackets 28 extend between the forward legs and the closed bottom of the basket. Each of the forward legs has a supplemental support leg 30 extending therethrough disposed above the lower ends whereby the supplemental support leg is orthogonally disposed with respect to the forward leg. The pair of forward legs have an extended orientation whereby they are perpendicular to the closed bottom of the basket and a collapsed orientation whereby they are folded upwardly to a position where a rearward extending portion 31 of the supplemental support legs abut the closed bottom of the basket. Once the forward legs are in the collapsed orientation, the supplemental support legs and the U-shaped handle will be positioned to support the basket so that the contents of the basket will be supported in an upright position. Note FIG. 4.

Lastly, the device includes a pair of rearward legs 32 each having an upper segment 34 and a lower segment 36. The upper segment has a length essentially equal to a height of the basket. Note FIG. 4. A lower end of each upper segment is pivotally coupled with an upper end of each lower segment. An upper end of each upper segment is pivotally coupled with a rearward portion of the closed bottom of the basket. A lower end of each lower segment have a caster 38 disposed thereon. The pair of rearward legs have an extended orientation whereby they are perpendicular to the closed bottom of the basket and a collapsed orientation whereby the upper segment is folded against a rear wall of the basket and the lower segment is folded within the open upper end of the basket.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A collapsible utility cart for use with automobile trunks for allowing packages to be placed within the trunk of an automobile without having to lift the packages comprising, in combination:

a basket having a generally rectangular configuration, the basket having an open upper end and a closed bottom;

a pair of forward legs each having an upper end pivotally coupled with a forward portion of the closed bottom of the basket, each of the forward legs having a caster disposed on lower ends thereof, a cross bar extends between the forward legs disposed upwardly of the lower end, a U-shaped handle extends between the forward legs disposed downwardly of the upper ends, a pair of pivot brackets extend between the forward legs and the closed bottom of the basket, each of the forward legs having a supplemental support leg extending therethrough disposed above the lower ends whereby the supplemental support leg is orthogonally disposed with respect to the forward leg, the pair of forward legs having an extended orientation whereby they are perpendicular to the closed bottom of the basket and a collapsed orientation whereby they are folded upwardly to a position where a rearward extending portion of the supplemental support legs abut the closed bottom of the basket; and a pair of rearward legs each having an upper segment and a lower segment, the upper segment having a length essentially equal to a height of the basket, a lower end of each upper segment pivotally coupled with an upper end of each lower segment, an upper end of each upper segment pivotally coupled with a rearward portion of the closed bottom of the basket, a lower end of each lower segment having a caster disposed thereon, the pair of rearward legs having an extended orientation whereby they are perpendicular to the closed bottom of the basket and a collapsed orientation whereby the upper segment is folded against a rear wall of the basket and the lower segment is folded within the open upper end of the basket.

2. A collapsible utility cart for use with automobile trunks:

a basket having a generally rectangular configuration, the basket having an open upper end and a closed bottom;

a pair of forward legs each having an upper end pivotally coupled with a forward portion of the closed bottom of the basket, each of the forward legs having a caster disposed on lower ends thereof, the pair of forward legs having an extended orientation whereby they are perpendicular to the closed bottom of the basket and a collapsed orientation whereby they are folded upwardly to a position abutting the closed bottom of the basket, each of the forward legs having a supplemental support leg extending therethrough disposed above the lower ends of the forward leas whereby the supplemental support leg is orthogonally disposed with respect to the forward leg, the supplemental legs and a U-shaped handle supporting the cart when in the collapsed orientation, the U-shaped handle extending between the pair of forward legs disposed downwardly of the upper ends of the forward legs; and a pair of rearward legs each pivotally coupled with a rearward portion of the closed bottom of the basket, each rearward leg having an upper segment and a lower segment, the upper segment having a length essentially equal to a height of the basket, a lower end of each upper segment pivotally coupled with an upper end of each lower segment, a lower end of each rearward leg having a caster disposed thereon, the pair of rearward legs having an extended orientation whereby they are perpendicular to the closed bottom of the basket and a collapsed orientation whereby they are folded within the open upper end of the basket.

3. The collapsible utility cart as set forth in claim 2 wherein a cross bar extends between the pair of forward legs disposed upwardly of the lower ends of the forward legs.

4. The collapsible utility cart as set forth in claim 2 wherein a pair of pivot brackets extend between the forward legs and the closed bottom end of the basket.

* * * * *